United States Patent
Korst et al.

(10) Patent No.: US 6,418,984 B1
(45) Date of Patent: *Jul. 16, 2002

(54) FEED DEVICE INTENDED FOR MOUNTING IN A FUEL TANK

(75) Inventors: Otto Korst, Herschbach; Detlef Pantring, Ortenberg, both of (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/718,959

(22) Filed: Nov. 22, 2000

(30) Foreign Application Priority Data

Nov. 23, 1999 (DE) .......................... 199 56 143

(51) Int. Cl.[7] .......................... B65B 1/30; B65B 31/00; B67C 3/02
(52) U.S. Cl. .......................... 141/94; 141/95; 141/192; 141/197; 141/198; 73/313; 73/317
(58) Field of Search .......................... 141/18, 94, 95, 141/192, 197, 198, 285, 286; 73/290 R, 313, 317

(56) References Cited

U.S. PATENT DOCUMENTS

| | | | | |
|---|---|---|---|---|
| 5,140,303 A | * | 8/1992 | Meyer | 340/450.2 |
| 5,752,409 A | * | 5/1998 | Lippmann et al. | 73/290 R |
| 5,765,435 A | * | 6/1998 | Grotschel et al. | 73/313 |
| 6,276,201 B1 | * | 8/2001 | Gette et al. | 73/317 |

* cited by examiner

Primary Examiner—Timothy M. Maust
(74) Attorney, Agent, or Firm—Cohen, Pontani, Lieberman & Pavane

(57) ABSTRACT

In a feed device with a filling-level sensor fastened to a wall of a baffle, the filling-level sensor has a lever wire for holding a float. The lever wire is fastenable in different orientations on a pivotably mounted yoke. The pivoting range of the float is set by the selected orientation of the lever wire. The feed device is consequently suitable for use in differently constructed fuel tanks.

14 Claims, 3 Drawing Sheets

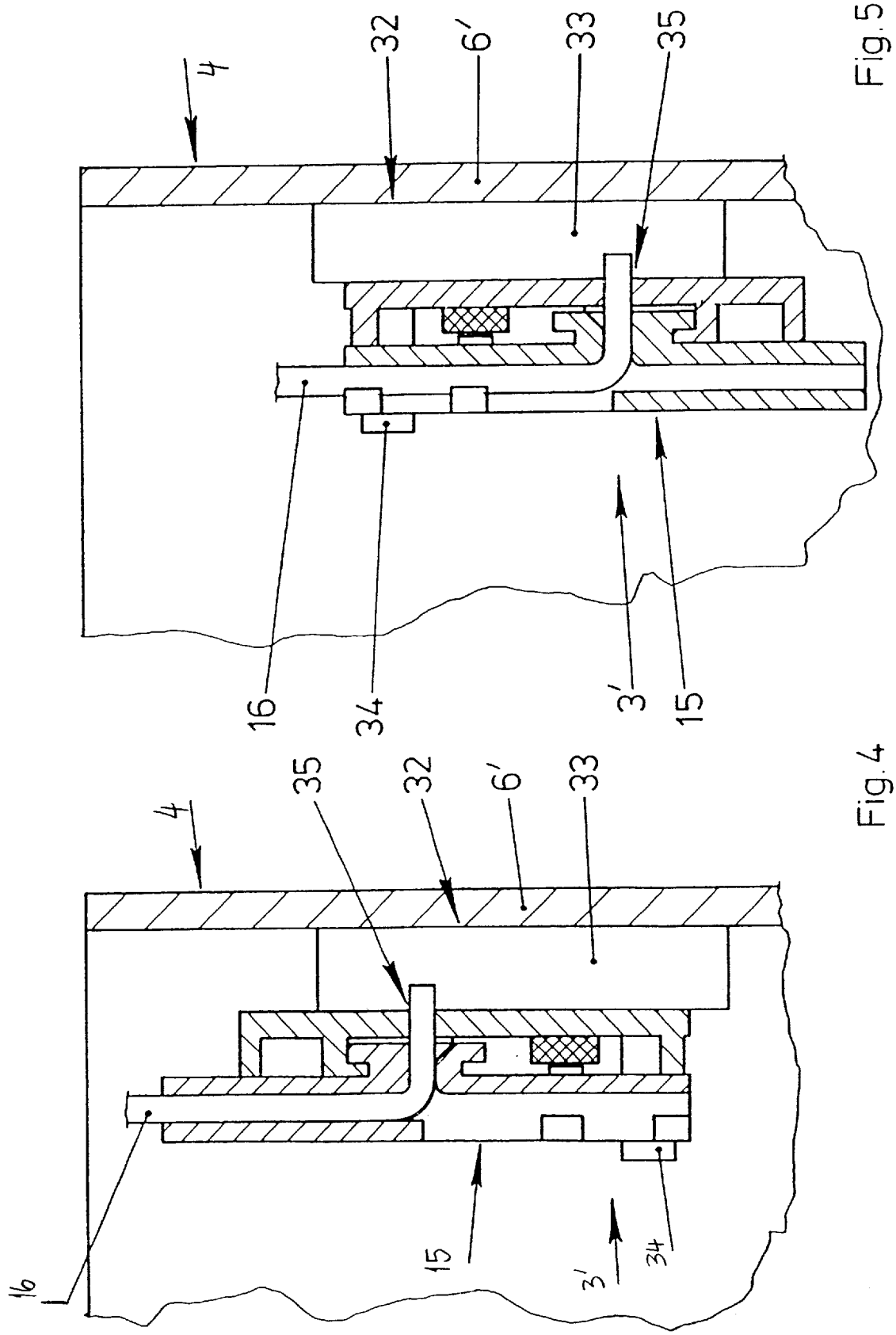

FEED DEVICE INTENDED FOR MOUNTING IN A FUEL TANK

BACKGROUND OF THE INVENTION

1. Field of the Invention

The present invention relates to a feed device for installation in a fuel tank having a baffle for collecting fuel, a feed unit for feeding fuel out of the baffle, and a filling-level sensor having a lever arm carrying a float pivotally arranged in a mounting on a carrier arranged on the baffle.

2. Description of the Related Art

Feed devices having baffles in which feed units and filling level sensors are arranged are often used in fuel tanks of present-day motor vehicles. The feed units are supported on the bottom of the fuel tank and are designed as a structural unit together with the baffle. The baffle has a guide with a plurality of orifices arranged at different heights. A carrier is arranged in the guide and has a lug for interlocking with one of the orifices. Accordingly, the carrier is connectable to the baffle at different heights thereby allowing standardized components of the feed device to be used in differently constructed fuel tanks which require different pivoting ranges of the float. The pivoting ranges of the float depend on the height of the fuel tank and on the intended installation position of the baffle or feed unit in the fuel tank.

The baffle is of double-walled design in the region of the guide and the orifices are arranged transversely to the longest extent of the guide. The baffle is consequently highly cost-intensive to manufacture. Furthermore, the baffle requires a high and therefore cost-intensive use of material, since the guide has to extend on the baffle over a region far exceeding the length of the carrier.

SUMMARY OF THE INVENTION

An object of the present invention is to provide a feed unit for installation in a fuel tank of a motor vehicle that it is suitable for use in a number of different fuel tanks of various configurations and can be produced particularly cost-effectively.

The object is met, according to the present invention, by a feed unit with a filling level sensor having a lever arm including a lever wire holding a float, the level wire being mountable in different orientations by a yoke of the lever arm which forms part of the mounting to set an intended pivoting range of the float.

As a result of this design, the orientation of the lever arm mounted on the carrier and the position of the float may be varied by an appropriate orientation of the carrier. The feed device according to the invention is therefore suitable for use in many different fuel tanks having a variety of configurations. The present invention obviates that need for very long and therefore cost-intensive guides. The feed device according to the invention can therefore be manufactured particularly cost-effectively. Moreover, the feed device according to the present invention requires only a very small amount of construction space because the carrier may be fastened on the feed unit or on the baffle at a position that is determined irrespective of the fuel tank design.

A further simplification of the mounting of the feed device according to the present invention is made by providing latching connections for holding the lever wire on the yoke. These latching connections are arranged on a plurality of legs of the yoke which point away from the region of the mounting.

In a further embodiment of the invention, the pivoting range of the lever arm is limited cost-effectively when the carrier has two stops for limiting the pivoting range of the yoke.

Alternatively, the carrier may have stops for limiting the pivoting range of the lever wire. In this embodiment the pivoting range of the float in the fuel tank will be varied in a simple way by changing the fastening of the lever wire to the lever.

The feed device according to the present invention is mountable in a particularly large number of different fuel tanks when the carrier is capable of being mounted in at least two different orientations at an intended position on the feed unit or on the baffle. In conjunction with the lever arm design according to the present invention, the capability of mounting the carrier in different orientations allows a multiplication of the possibilities for setting the pivoting range of the float.

The position of the lever arm may, for example, be detected via a magnetically active position sensor in which a magnetic network arranged on the carrier detects the position of a magnet arranged on the lever arm and converts it into electrical signals. In a further embodiment, the position of the lever arm is detected by a position sensor designed as a potentiometer. Detrimental influences on the functioning of the potentiometer may be avoided in a simple way when the carrier is arranged on the inside of the baffle. This embodiment, ensures that the resistance slide track is covered with fuel at all times during operation. Moreover, the filling-lever sensor operates with a high degree of accuracy as a result.

According to yet a further embodiment of the present invention, the baffle or the feed unit can be designed particularly cost-effectively as cylindrical components when the carrier has vertical strips arranged for connecting the carrier to the baffle or to the feed unit.

The feed device according to the present invention is of particularly simple design when the carrier has a first carrier part connected to the baffle or to the feed unit and a second carrier part on which the lever arm is mounted. The carrier parts are positively connected to one another and may also be constructed in a particularly simple way.

The first carrier part could, for example, be fastened in different orientations to the baffle or to the feed unit. However, a contribution to further simplifying the construction of the feed unit according to the invention is made when the second carrier part is capable of being mounted in at least two different orientations on the first carrier part.

The feed device according to the invention is of particularly simple design when a position sensor converting the position of the lever arm into electrical signals is arranged on the second carrier part.

The mounting of the feed device according to the present invention is particularly simple when the carrier parts are connected to one another via a latching connection.

A further simplification of the manufacture of the components of the feed device according to the present invention is made when the second carrier part has lugs facing the first carrier part and when latching means of the first carrier part are provided for engaging behind the lugs and prestressing the second carrier part against a stop. As a result, the carrier parts can in each case be manufactured cost-effectively in an axial-removal injection mold. Undercuts requiring the use of cores in the injection mold are avoided by this design.

According to another embodiment of the present invention, the yoke is guided with particular accuracy when the carrier possesses tracks which are arranged on mutually opposing regions of the mounting and on which the yoke is supported or guided. Accordingly, as the yoke pivots about the mounting, the radially outer regions of the yoke are guided in the tracks arranged on opposing sides of the mounting. This contributes to increasing the accuracy of the signals from the position sensor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 4 is a longitudinal sectional view of a baffle of a feed unit according to a further embodiment of the present invention; and FIG. 5 is the baffle with the filling-level sensor from FIG. 4 in a different orientation.

DETAILED DESCRIPTION OF THE PRESENTLY PREFERRED EMBODIMENTS

Figure 1:
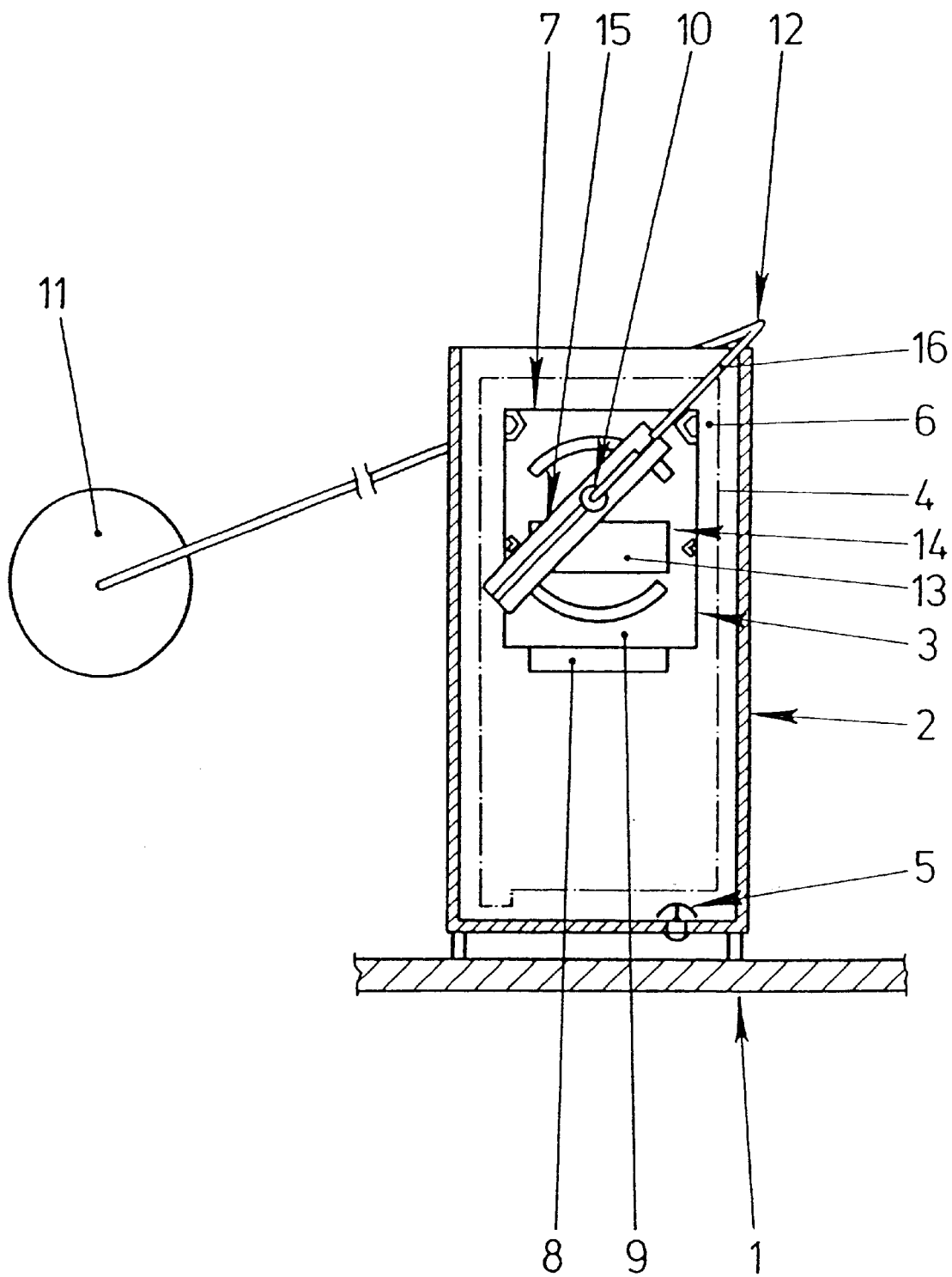
FIG. 1 is a longitudinal sectional view of a baffle of a feed device inserted into a fuel tank according to an embodiment of the present invention.

FIG. 1 is a longitudinal sectional view of a baffle 2 arranged in a bottom region of a fuel tank 1. The baffle 2 includes a filling-level sensor 3 and a feed unit 4 indicated by dashes and dots in the drawing. The feed unit 4 feeds fuel out of the baffle 2 to an internal combustion engine which is not illustrated. A bottom valve 5 is arranged in the baffle for filling the baffle 2 with fuel.

The filling-level sensor 3 is fastened to a vertical wall 6 inside the baffle 2 via a carrier 7. The wall 6 may comprise part of the feed unit 4 or part of the baffle 2. The carrier 7 includes a first carrier part 8 connectable to the wall 6 and a second carrier part 9 positively connected to the first carrier part 8. The second carrier part 9 has a mounting 10 in which a lever arm 12 carrying a float 11 is pivotally received. A resistance slide track 13 of a position sensor 14 designed as a potentiometer is also arranged on the second carrier part 9. As an alternative, the position sensor 14 may also be designed as a magnetically passive position sensor with a resistance network arranged on the second carrier part 9 for detecting the position of a magnet arranged on the lever arm 12. The float 11 is held by a lever wire 16 fastened to a yoke 15 of the lever arm 12 and follows a fuel level in the fuel tank 1. As the fuel level in the tank varies, the lever arm 12 is pivoted about the mounting 10 and the position of said lever arm is converted into electrical signals by the position sensor 14.

Figure 2:
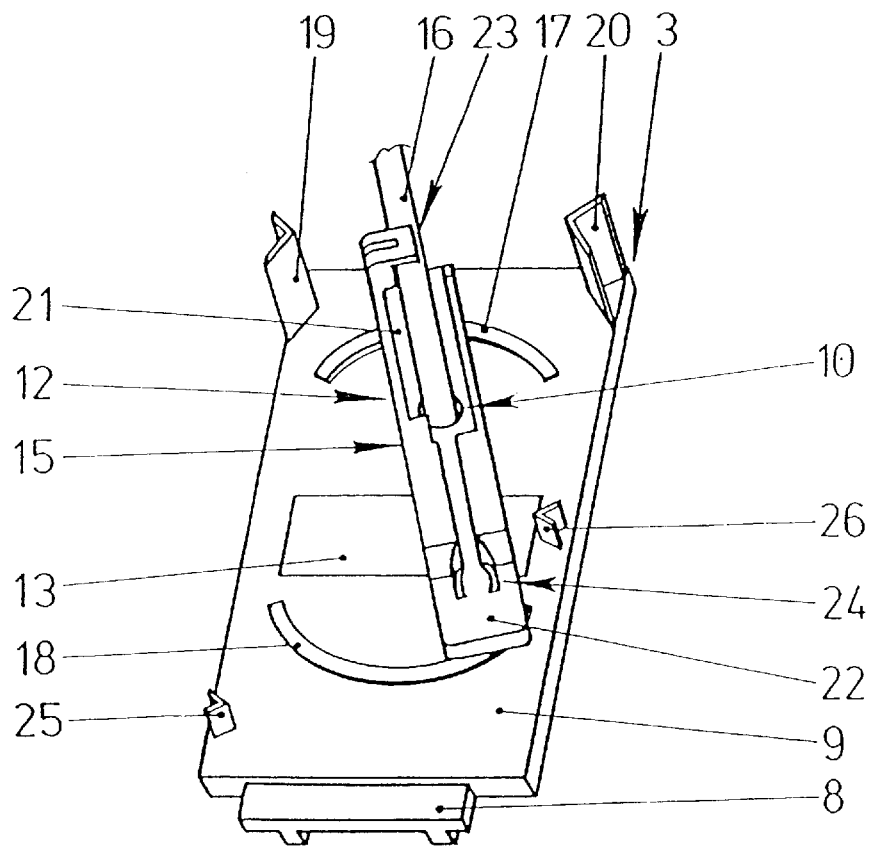
FIG. 2 is a perspective view from the front of a filling-level sensor from the feed device of FIG. 1.

FIG. 2 is an enlarged perspective illustration of a portion of the filling-level sensor 3 which is fastened to the wall 6 of the baffle 2 shown in FIG. 1. The second carrier part 9 has two arcuate slideways 17, 18 for the yoke 15 which are arranged concentrically to the mounting 10. In the position shown in FIG. 2, the pivoting range of the lever arm 12 is limited by stops 19, 20 which contact the lever wire 16 at the ends of the ranger of movement. The yoke 15 has two legs 21, 22 pointing away from the mounting 10. Each leg 21, 22 has a latching connection 23, 24 for receiving the lever wire 16. The lever wire 16 can be snapped together with leg 21 of the yoke 15 in either the leg 21 in the pivoting direction as shown in FIG. 2. Alternatively, the lever wire 16 may also be snapped in the other leg 22 in a vertical direction. The legs 21, 22 are illustrated in the drawing at an angle of 180° to one another. However, the legs 21, 22 may be arranged at an angle to one another which differs from 180° to increase the number of possibilities for using the filling-level sensor 3 in different fuel tanks. Accordingly, the lever wire 16 may be fastened to the yoke 15 in either of the legs 21, 22 and therefore in different orientations. When the lever wire 16 is fastened to the other leg 22 of the yoke 15, two further stops 25, 26 arranged next to the resistance slide track 13 limit the pivoting range of the yoke 15. To further increase the possibilities for setting the pivoting range of the float 11 illustrated in FIG. 1, the yoke 15 may also have further legs which are not illustrated.

Figure 3:
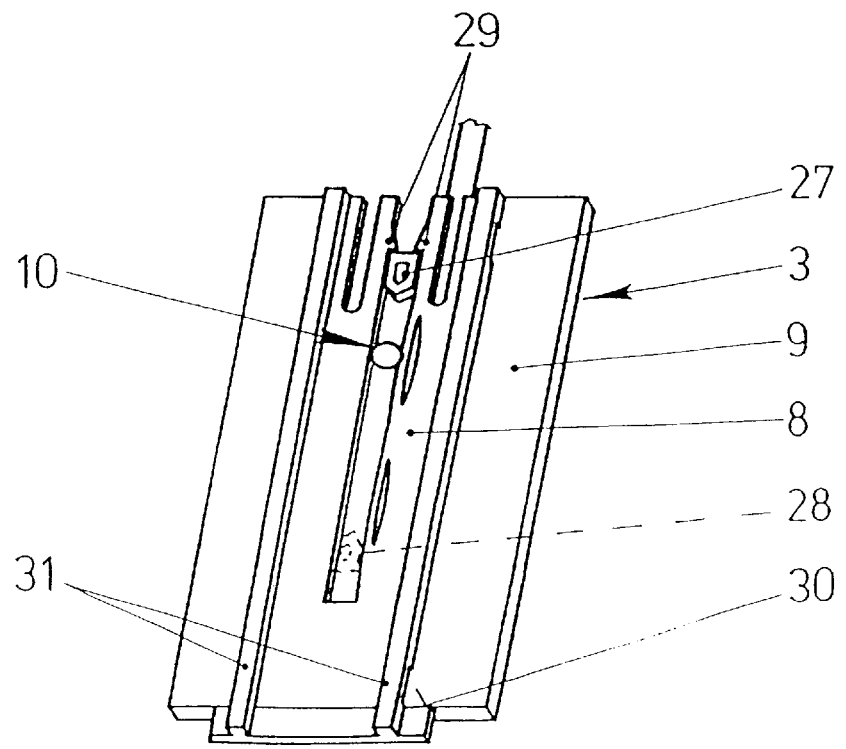
FIG. 3 is a perspective view from the rear of the filling-level sensor of FIG. 2.

FIG. 3 shows a rear view of the filling-level sensor 3 from FIG. 2. Two lugs 27, 28 are arranged on the second carrier part 9. In the position depicted, the two lugs are pushed between two latching arms 29 of the first carrier part 8 which engage behind one of the lugs 27. The engagement prestresses the second carrier part 9 against a stop 30 arranged on the first carrier part 8. The second carrier part 9 may be connected to the first carrier part in a further orientation rotated 180° relative to the orientation shown in FIG. 3. The second lug 28 is used for fastening the second carrier part 9 in the further orientation. The mounting 10 for the yoke 15 in FIG. 2 is arranged nearer to one lug 27 than to the other lug 28 so that the pivoting range of the float 11 illustrated in FIG. 1 is dependent on the orientation of the second carrier part 9 on the first carrier part 8. Furthermore, the first carrier part 8 has two strips 31 which face the wall 6 illustrated in FIG. 1 via which said first carrier part 8 is connected to the wall 6 via, for example, a welded connection. When the first carrier part 8 is fastened to the wall 6, the strips 31 of the first carrier part 8 are first inserted into a fixture. The fixture is aligned with the boundaries of the wall 6 during welding. In the case of the filling-level sensor 3 shown in FIG. 1, the first carrier part 8 was fastened to the wall 6 with the stop 30 at the lower end so that the mounting 10 is in a high position. However, the first carrier part 8 may also be fastened to the wall 6 with the stop 30 at the upper end. In this case, the mounting 10 assumes a low position relative to the first carrier part 8. The carrier 7 is therefore capable of being mounted in different orientations at an intended location on the baffle 2 illustrated in FIG. 1. As a result of the various orientations, the pivoting range of the float 11 illustrated in FIG. 1 may be varied. By combining various orientations of the carrier parts 8, 9 and the yoke 15, the feed device may be adapted, with standard components, for a multiplicity of differently constructed fuel tanks.

FIGS. 4 and 5 show a further embodiment of the feed device according to the present invention in a longitudinal section through a filling-level sensor 3' fastened to a wall 6' of the feed unit 4 and having a one-piece carrier 32. Of course, the filling level sensor 3' in the embodiment of FIGS. 4 and 5 may also be connected to the wall 6 of the baffle 2 as in the embodiment of FIGS. 1–3. Likewise, the filling level sensor 3 of the embodiment of FIGS. 1–3 may be mounted on a wall 6' of the feed unit 4.

Referring to the embodiment of FIGS. 4 and 5, the carrier 32 has strips 33 welded to the wall 6' of the feed unit 4 and stops 34 for limiting the pivoting range of the yoke 15. The carrier 32 is connectable in two different orientations at the same point on the wall 6' of the feed unit 4. The filling-level sensor 3' is of asymmetric design so that the mounting 35 of the yoke 15 is arranged at different heights as a function of the orientations of the carrier 32. As a result, the pivoting range of the float 11 connected to the lever wire 16 (see FIG. 1) can be varied in a simple way. As in the embodiment from FIGS. 1 to 3, the lever wire 16 can be interlocked in either leg 21, 22 of the both directions of the yoke 15.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A feed device for installation in a fuel tank, comprising:
   a baffle arrangeable for collecting fuel in the fuel tank:
   a feed unit arranged in said baffle for feeding fuel out of said baffle;
   a filling-level sensor having a carrier and a mounting, said carrier being mounted on a wall of one of said baffle and said feed unit; and
   a lever arm having a lever wire connected with a float and a yoke, wherein said yoke is pivotally connected to said carrier via said mounting, and wherein said lever wire is selectively connectable to said yoke in at least two different orientations for changing an intended pivoting range of said float.

2. The feed device of claim 1, wherein said yoke comprises a plurality of legs which extend away from a region of said mounting, and wherein said yoke further comprises latching connections arranged on said plural legs for holding said lever wire onto said yoke.

3. The feed device of claim 1, wherein said carrier further comprises two stops for limiting the pivoting range of said yoke.

4. The feed device of claim 1, wherein said carrier further comprises stops for limiting the pivoting range of said lever wire.

5. The feed device of claim 1, wherein said carrier is connectable in at least two different orientations at an intended position on said wall of one of said baffle and said feed unit.

6. The feed device of claim 1, wherein said carrier is arranged on an inside of said baffle.

7. The feed device of claim 1, wherein said carrier comprises vertical strips and said carrier is connected to said wall of one of said baffle and said feed unit via said vertical strips.

8. The feed device of claim 1, wherein said carrier comprises a first carrier part connected to said wall of one of said baffle and said feed unit and a second carrier part comprising said mounting, wherein said first and second carrier parts are positively connected to one another.

9. The feed device of claim 8, wherein said second carrier part is selectively mountable in at least two different orientations on said first carrier part.

10. The feed device of claim 8, wherein said filling level sensor comprises a position sensor operatively arranged on said second carrier part for converting a position of said lever arm into electrical signals arranged.

11. The feed device of claim 8, wherein said first and second carrier parts are connected to one another via a latching connection.

12. The feed device of claim 11, wherein said second carrier part comprises first and second lugs facing said first carrier part, and wherein said first carrier part comprises a stop and a latching means for engaging behind one of said first and second lugs for prestressing said second carrier part against said stop when said second carrier part is connected to said first part.

13. The feed device of claim 12, wherein said second carrier part is selectively connectable to said first carrier part in a first orientation in which said latching means engages behind said fist lug and a second orientation in which said latching means engages behind said second lug.

14. The feed device of claim 1, wherein said carrier comprises two slideways for supporting the pivotal movement of said yoke, said slideways being arranged on mutually opposing sides of said mounting.

* * * * *